INVENTOR.
WILLIAM S. DUSTMAN

United States Patent Office 2,806,157
Patented Sept. 10, 1957

2,806,157

ELECTRIC CONTROL SYSTEM

William S. Dusiman, Cleveland Heights, Ohio, assignor to Mechanical Handling Systems, Inc., Detroit, Mich., a corporation of Michigan Application October 6, 1954, Serial No. 460,527

29 Claims. (Cl. 310—94)

This invention relates to electrical control systems and, as it principal object, aims to provide a new and improved system for effectively controlling the speed of operation of electrically powered apparatus, such that a substantially constant speed will be maintained regardless of variations of substantial amounts in the loading of the apparatus and such that a desired amount of regulation in the speed of the apparatus will also be readily obtainable.

The invention is especially applicable to conveyors and other equipment being electrically driven, such as through a magnetic clutch of the eddy-current type and, by way of example, is herein disclosed as applied to that use, although the invention is not limited in this respect since it can be applied to various other specific uses and forms of apparatus.

Another object of the invention is to provide an electric control system in which a speed-change detecting means is automatically effective on the driving mechanism through a magnetic amplifier, such that a selected rate of speed for the driven apparatus will be substantially maintained regardless of variations occurring in the load.

A further object is to provide an electric control system of this character in which the output circuit of the control system includes a load coil, such as a coil of the driving mechanism, and in which the magnetic amplifier has control windings which include a negative feed-back winding energized from such output circuit.

Still another object is to provide such an electric control system in which the control windings of the magnetic amplifier include a control winding energized from the speed-change detecting means.

Another object of the invention is to provide an electric control system of the character referred to above having a wide speed range and high stability, and in which the output circuit of the control system includes a clutch coil and a torque limiting resistance means which is automatically effective for limiting the torque capacity of the clutch.

Another object is to provide such an electric control system in which the control windings of the magnetic amplifier include a winding or windings and means to energize the winding or windings from the speed detecting means, which has an electrical output dependent upon the speed of the load so as to change the output of the amplifier to counteract a speed change, thereby maintaining a substantially constant speed, and means to energize the winding or windings to oppose the speed change called for by the speed detecting means and operable only when the speed is changing whereby the stabilization of the system is increased.

Yet another object is to provide an electric speed control system of the kind above mentioned in which the magnetic amplifier comprises reactor means of the self-saturating type.

As another important object, this invention provides an electric speed control system of the kind indicated above in which an adjustable control means for selecting a desired speed of operation for the driven apparatus is embodied in the speed-change detecting means, and in which a single adjustable control means so located acts as a speed selecting means for a group of such control systems.

It is also an object of this invention to provide an electric control system embodying an overload protective device for an electrically powered mechanism and in which the actuation of the overload device is controlled by saturable reactor means.

As a further object, this invention provides such an overload responsive control system in which the reactor means is a self-saturating reactor and in which the overload protective device is a relay having its magnet coil in the circuit of the main energizing winding of the self-saturating reactor.

Still another object is to provide such an overload responsive control system in which the saturable reactor of the overload protection means has control windings, including a control winding whose energization is controlled by the speed-change detecting means and a control winding whose energization is dependent upon the energization of the output circuit of the control system.

Additionally, this invention provides such an overload responsive speed control system in which the control windings of the saturable reactor of the overload protection means include a bias winding and an adjustable control means in the energizing circuit of the bias winding for varying the responsiveness of the overload protection means.

The invention can be further briefly summarized as consisting in certain novel combinations and arrangements of parts hereinafter described and particularly set out in the claims hereof.

In the accompanying sheets of drawings, forming a part of this specification:

Figure 1:
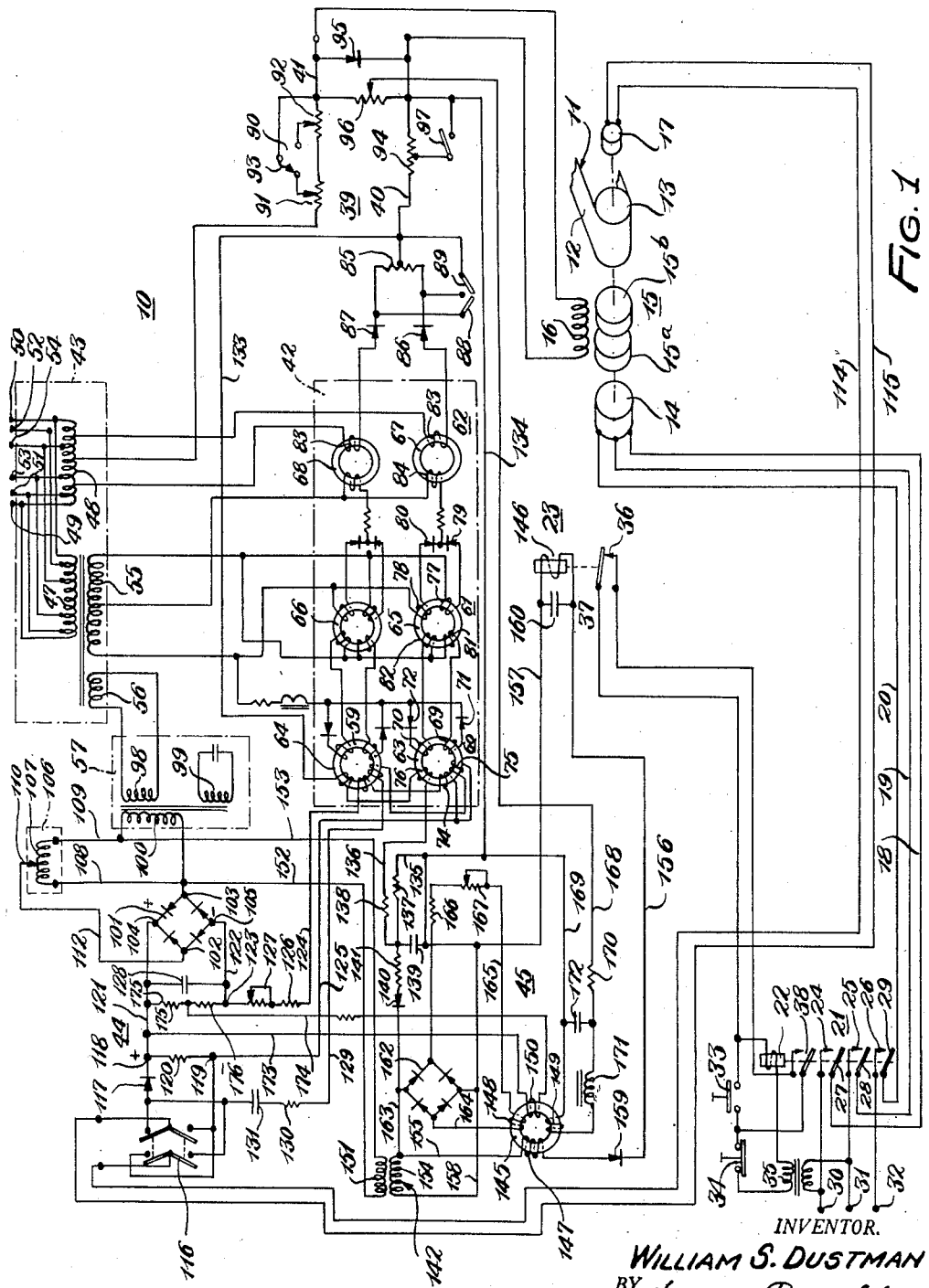
Fig. 1 is a wiring diagram showing a control system embodying the present invention.

As one practical embodiment of this invention, Fig. 1 shows an electric control system 10 for controlling the speed of actuation of variable-load electrically driven apparatus, such as the conveyor 11 shown in this instance. The conveyor 11 comprises an endless carrier or belt 12 extending around a rotatable drive member 13 which is driven by an electric motor 14 through a magnetic clutch 15. The magnetic clutch 15 is here shown as being a clutch or coupling of the eddy-current type having relatively rotatable rotor and field members 15ª and 15ᵇ and a field winding 16. A direct current tachometer generator 17 is suitably connected with the drive member 13 of the conveyor 11 to be driven at the same speed as the conveyor, or at a speed proportional thereto, for a purpose to be explained hereinafter.

The driving motor 14 is here shown as being a three-phase alternating current motor which is connected with an available source of alternating current through conductors 18, 19 and 20 and through a switch 21 having an actuating magnet 22. The energization of the magnet 22 is controlled by an overload relay 23 whose operation will be described hereinafter.

The switch 21 comprises stationary contacts 24, 25 and 26 which are engageable by movable contacts 27, 28 and 29 in response to energization of the magnet 22 for connecting the conductors 18, 19 and 20 with the power supply terminals 30, 31 and 32. The switch 21 also comprises a normally open manually operable starting switch 33 and a normally closed manually operable stopping switch 34. The starting and stopping switches 33 and 34 control the energization of the magnet 22 by current supplied from a current transformer 35. The energizing circuit for the magnet 22 also includes stationary and movable contacts 36 and 37 of the overload relay 23, and a holding circuit switch 38 which forms a part of the switch device 21 and is located in a holding circuit for the magnet 22 to maintain the magnet 22 energized after release of starting switch 33. The starting switch 33 is usually held closed manually until the driving motor 14 has substantially reached its full operating speed.

The output circuit 39 of the control system 10 is represented by the conductors 40 and 41 and includes the field winding 16 of the magnetic clutch 15. The output circuit 39 is connected with the power source through a multiple-stage, push-pull magnetic amplifier 42, which will be further described hereinafter, and a power transformer 43.

The energization of the output circuit 39 is controlled by a speed-detecting means 44 which is effective on such output circuit through the magnetic amplifier 42. The actuation of the conveyor 11 by the driving motor 14 is controlled by the extent to which the clutch winding 16 is energized by the output circuit and is also controlled by an overload responsive means 45 which includes the overload relay 23.

The power transformer 43 has primary windings 47 and an auto-transformer winding 48 which are connected with pairs of terminals 49, 50; 51, 52; and 53, 54 to which alternating current of various different voltages is supplied from the power source. The transformer 43 also comprises a secondary winding 55 for supplying current of appropriate voltage to the magnetic amplifier 42 and a secondary winding 56 which provides a source of current for a constant voltage transformer unit 57, whose purpose will be explained hereinafter.

The magnetic amplifier 42 is a high-gain amplifier and is here shown as comprising three amplifying stages 60, 61 and 62. The first stage 60 comprises a pair of saturable reactors 63 and 64 which are here shown as having saturable toroidal cores 59 of a suitable construction. The second stage 61 comprises a pair of saturable reactors 65 and 66, and the third or final stage 62 comprises a pair of saturable reactors 67 and 68.

The reactors 63 and 64 of the first stage 60 are connected in push-pull relationship and each have a pair of main energizing windings 69 and 70 on the cores thereof which are suitably connected with the secondary winding 55 of the power transformer 43 through rectifiers 71 and 72. The reactors 63 and 64 are each provided with three control windings 74, 75 and 76 which will be described hereinafter.

The reactors 65 and 66 of the second stage 61 of the magnetic amplifier 42 are connected in push-pull relationship and are each provided with a pair of main energizing windings 77 and 78 which are suitably connected with the secondary winding 55 of the power transformer 43 through rectifiers 79 and 80. The reactors 65 and 66 are also each provided with a pair of control windings 81 and 82 which are connected in circuit with the main energizing windings 69 and 70 of the reactors 63 and 64 of the first stage 60, such that the control function of the control windings 81 and 82 and therefore the output of the reactors 65 and 66 will be responsive to the output of the reactors 63 and 64 of the first stage 60.

The reactors 67 and 68 of the third stage 62 constitute a parallel connected magnetic amplifier and each have a main energizing winding 83 which is suitably connected with the winding 48 of the power transformer 43, and a control winding 84. The control windings 84 are connected in circuit with the windings 77 and 78 of the reactors 65 and 66 of the second stage, such that the output of the reactors of the third stage will be responsive to the energization of the control windings 84 by the output of the reactors of the second stage 61.

The conductor 40 of the output circuit 39 is connected with the windings 83 of the third stage reactors 67 and 68 through a resistor 85 and a pair of rectifiers 86 and 87. The conductor 41 of the output circuit 39 is connected in circuit with the reactor windings 83 through the winding 48 of the power transformer 43.

The output circuit 39 includes a torque limiting control device 90 comprising a pair of variable resistors 91 and 92 and a selecting switch 93 associated with these resistors. The output circuit also includes a feed-back resistor 94 whose purpose will be described hereinafter, and a commutating rectifier 95. Connected across the load conductors 40 and 41 of the output circuit and in parallel with the rectifier 95 is a potentiometer type resistor 96. The rectifier 95 and the potentiometer type resistor 96 operate in conjunction with each other to minimize any detrimental effects resulting from the inductive load represented by the clutch winding 16. The rectifier absorbs the reverse voltage developed by the inductance of the clutch coil at the end of each one-half cycle, and the resistor 96 dissipates the energy of the surges which occur each one-half cycle across the output circuit. The resistor 94 is adjustable by opening or closing the switch 97 in accordance with the size or torque rating of the magnetic clutch 15 being used. The value of the resistor 85 can also be varied or the resistor can be shorted out by means of switches 88 and 89 and depending upon the torque rating of the magnetic clutch 15.

The speed-detecting means 44 is automatically responsive to the speed of operation of the conveyor 11 and comprises the constant voltage transformer 57 as a source of current of a substantially constant voltage value, and the tachometer generator 17 as a source of current, preferably unidirectional, of a voltage value which is variable in accordance with the rate at which the conveyor is driven. The substantially constant voltage provided by the constant voltage transformer 57 is utilized as a reference voltage with which the variable voltage from the tachometer generator 17 is compared and algebraically combined.

The constant voltage transformer 57 comprises primary and stabilizing windings 98 and 99, and a secondary winding 100 whose terminals provide the source of substantially constant voltage for the speed-detecting means 44. The constant value reference voltage of the secondary winding 100 is made available for comparison with the variable voltage of the tachometer generator 17 through a bridge-type rectifier 101 having a pair of alternating current terminals 102 and 103 and a pair of direct current terminals 104 and 105.

The rectifier 101 is connected with the output winding 100 of the transformer 57 through a variable voltage autotransformer or so-called powerstat 106 which constitutes a remote speed setting control for selecting or varying the speed at which the conveyor 11 is to be driven. The powerstat 106 comprises an auto-transformer winding 107 which is connected across the output winding 100 of the transformer 57 by the conductors 108 and 109. The powerstat 106 also comprises a manually adjustable output tap connection 110 with which the alternating current terminal 102 of the rectifier 101 is connected by the conductor 112. The other alternating current terminal 103 of the rectifier is connected with the powerstat winding 107 through the conductor 108.

The direct current output of the tachometer generator 17 is delivered through a pair of conductors 114 and 115 to a polarity reversing switch 116 and thence through a rectifier 117 to a pair of terminal points 118 and 119 across which a resistor 120 is connected. The direct current terminal 104 of the rectifier 101 is connected with the terminal point 118 of the tachometer generator circuit through the conductor 121. The terminal point 119 of the tachometer generator circuit and the other direct current terminal 105 of the rectifier 101 are connected with each other through the energizing circuit for the main control windings 74 of the reactors 63 and 64 of the first stage 60 of the magnetic amplifier 42. This energizing circuit for the control windings 74 thus extends from the direct current terminal 105 of the rectifier 101 through the conductor 122 to the terminal point 123 and thence through the conductor 124 to the windings 74 and back to the terminal point 119 through the conductor 125.

In the arrangement just above described, the polarity of the tachometer generator is in opposition to the polarity of the constant value reference voltage, such that the control windings 74 of the reactors 63 and 64 will be energized in accordance with the algebraic sum or resultant value of these opposing voltages. The rectifier 117 prevents the direct current output from the rectifier 101 from passing through the tachometer generator 17 while passage of such direct current output through the energizing circuit of the reactor windings 74 is permitted by the resistor 120. A resistor 126 of suitable value provided in the conductor 124, limits the amount of current which is supplied to the control windings 74. A regulating resistance 127, also provided in the conductor 124, varies the energization of the control windings 74 for controlling the gain or sensitivity of the magnetic amplifier 42. A capacitor 128 of a suitable capacity value is connected between the conductors 121 and 122 and across the output terminals 103 and 104 of the rectifier 101 and serves to filter and stabilize the voltage supply being delivered through the rectifier from the constant voltage transformer 57.

The control windings 74 of the reactors 63 and 64 constitute speed-detecting windings which, as explained above, are energized in accordance with the resultant value of the algebraically combined voltages of the constant voltage source 57 and the tachometer generator 17 such that the output of the magnetic amplifier 42 will be directly responsive to speed variations occurring in the operation of the conveyor 11, such as might result from increasing or decreasing the load of the conveyor. When a tendency exists for the speed of the conveyor to increase, such as upon the removal of load, the tachometer generator will also be driven at an increased speed and its increased voltage output corresponding with this increased speed will be supplied to the control windings 74 in opposition to the reference voltage to decrease the extent of saturation of the reactors due to the reference voltage and decrease the output of the magnetic amplifier 42. This will result in decreased energization of the clutch coil 16 to thereby automatically counteract the increase in conveyor speed.

When a tendency exists for the conveyor speed to decrease due to an increase in the conveyor load, this condition will be effective through the tachometer generator 17 in an opposite manner and energize the control windings 74 to increase the output of the magnetic amplifier 42. This will result in an increased energization of the clutch winding 16 to automatically counteract the decrease in the conveyor speed. Thus, the speed-detecting means 44 will be automatically effective through the magnetic amplifier 42 for maintaining the speed of the conveyor 11 substantially constant regardless of changes in conveyor load.

The control windings 75 of the reactors 63 and 64 are connected with the tachometer generator 17 by the conductors 129 and 125, the latter conductor being common to the energizing circuits of both sets of control windings 74 and 75. These control windings 75 are stabilizing windings which provide a derivative form of stabilization for the control system.

The energizing circuit for the control windings 75 includes a suitable resistor 130 and a capacitor 131 in the conductor 129. The capacitor 131, in combination with the inductance of the control windings 75, tunes the energizing circuit for these control windings so as to provide a low-impedance path at low frequencies, such that this circuit can be energized by an alternating or pulsating voltage having a frequency corresponding to the variations in the output voltage of the tachometer generator 17 when a change is taking place in the speed of the conveyor 11. The connections to control winding 75 and the phase of the current therein are such that the windings 75 oppose the action of control windings 74 due to a change in tachometer output.

The control windings 75 and their energizing circuit in combination with the tachometer generator provide a speed-detecting means which will be responsive to variations in the output voltage of the tachometer generator due to changes in conveyor speed while such changes are taking place. The capacitor 131 permits the alternating or pulsating low frequency voltage variations to be transmitted to the control windings 75, but prevents the direct current level of the tachometer generator from being transmitted to these control windings. The control windings 75 will, therefore, be energized in accordance with a low frequency alternating or pulsating voltage output of the tachometer generator resulting from speed changes of the conveyor 11 opposing the direct current winding connected to the tachometer to provide a stabilization effect which occurs only on speed changes.

The powerstat 106 provides a simple and practical remote control for regulating and selecting the speed at which the conveyor 11 is to be driven and accomplishes this purpose by varying the value of the reference or bias voltage and thus varying the energization of the control windings 74 of the reactors 63 and 64. Movement of the control connection 110 in a direction to increase the value of the reference voltage, will increase the output of the rectifier 101 and will result in an increase in the extent of saturation of the reactors due to the control windings 74 to thereby increase the extent of energization of the clutch winding 16 and increase the speed at which the conveyor 11 is driven. Adjustment of the control connection 110 in the opposite direction will decrease the output of the rectifier 101 and will result in a decrease in the energization of the clutch winding 16 and, consequently, will decrease the speed at which the conveyor is driven.

The control windings 76 of the reactors 63 and 64 are negative feed-back windings for stabilizing the operation of the control system. The windings 76 are connected with the output circuit 39 by the conductors 133 and 134, such that these windings are energized in accordance with the voltage drop across the resistor 94 of the output circuit.

The energizing circuit for the control windings 76 also extends through conductors 135 and 136 and through the resistors 137 and 138 in the latter conductors. A capacitor 139 is connected across the terminals of the resistor 137 to act as a filter. A direct current bias for resistor 137 is provided by a rectifier 140 having one side connected to one terminal of resistor 137, which is connected with the capacitor 139 through a resistor 141 and the other side connected to the other terminal of resistor 137 through the secondary of a power supply transformer 142 to be more fully described hereinafter.

The control windings 76 are responsive to change in the energization of the output circuit 39 such that an increase in the energization of the output circuit causes increased energization of these feed-back control windings which, in turn, causes a decrease in the output of the magnetic amplifier and consequently tends to oppose any change in the energization of the output circuit. The control windings 76, therefore, act as stabilizing windings which effectively eliminate undesirable hunting effects in the control system and in the operation of the conveyor 11.

The voltage applied to the energizing circuit of the control windings 76 through the rectifier 140 provides a constant bias which shifts the characteristic curve of the magnetic amplifier 42 to avoid discontinuities in the characteristic curve which may be present at low levels of operation and give the amplifier a desired substantially continuous characteristic for the full range of performance of the control system.

It is desirable that the magnetic amplifier 42 be a high-gain amplifier so that the system 10 will afford good regulation with respect to sensitivity and range. On the other hand, the gain of the amplifier, and therefore the range of regulation, is limited mainly by the stability of the system. The stability of the system is, in turn, determined primarily by the time response of the load as compared to the time response of the speed-detecting means 44 and of the amplifier 42.

By using as the magnetic amplifier 42, an amplifier having a sufficiently high gain to permit the use of negative feed-back control windings 76, the system 10 will have good stability over a wide range. When the values of the negative feed-back provided by the control windings 76 are sufficiently large, the system gain becomes a function of the the ratio of feed-back to output.

The above-mentioned torque limiting device 90 represents an important feature of the invention. The resistance of this device in the output circuit 39 will have only a very small effect on the system performance up to the maximum output. When maximum output is reached, however, the gain will drop off rapidly such that the use of the torque limiting device 90 will provide what can be figuratively referred to as a magnetic shear pin effect. By varying the resistance value of the device 90, the point at which the rapid fall-off occurs can be varied as desired. The torque limiting device 90 thus provides a simple and effective means by which the operation of the system 10 and the conveyor 11 can be confined to their rated capacity.

Figure 3:
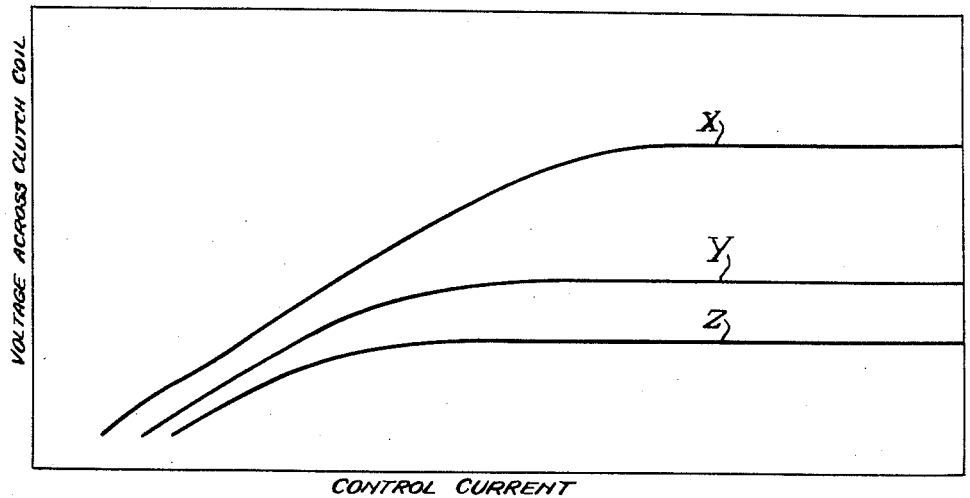
Fig. 3 is a diagrammatic view graphically illustrating the effect of the torque limiting resistance means of the output circuit on the voltage at which the clutch coil is energized.

The effect of varying the series resistance of device 90 in the output circuit 39 may be seen from the curves X, Y and Z of Fig. 3. These curves represent voltage values across the clutch coil 16 as a function of the control current in the control windings 74 of the magnetic amplifier 42 with the series resistance as a parameter. Curve X of Fig. 3 represents the clutch energizing voltage for a given resistance value of the torque limiting device 90, while the curves Y and Z represent clutch energizing voltages obtainable with two relatively higher resistance value settings of the torque limiting device. As the series resistance of the device 90 is increased, the current in the output circuit 39 is limited to thereby limit the torque capacity of the magnetic clutch. It will be seen that the gain of the amplifier 42, which is a function of the ratio of the output voltage with respect to the control current, is substantially constant until that point of the curve where the torque limiting resistors of the torque limiting device 90 take over to limit the output current.

Figure 2:
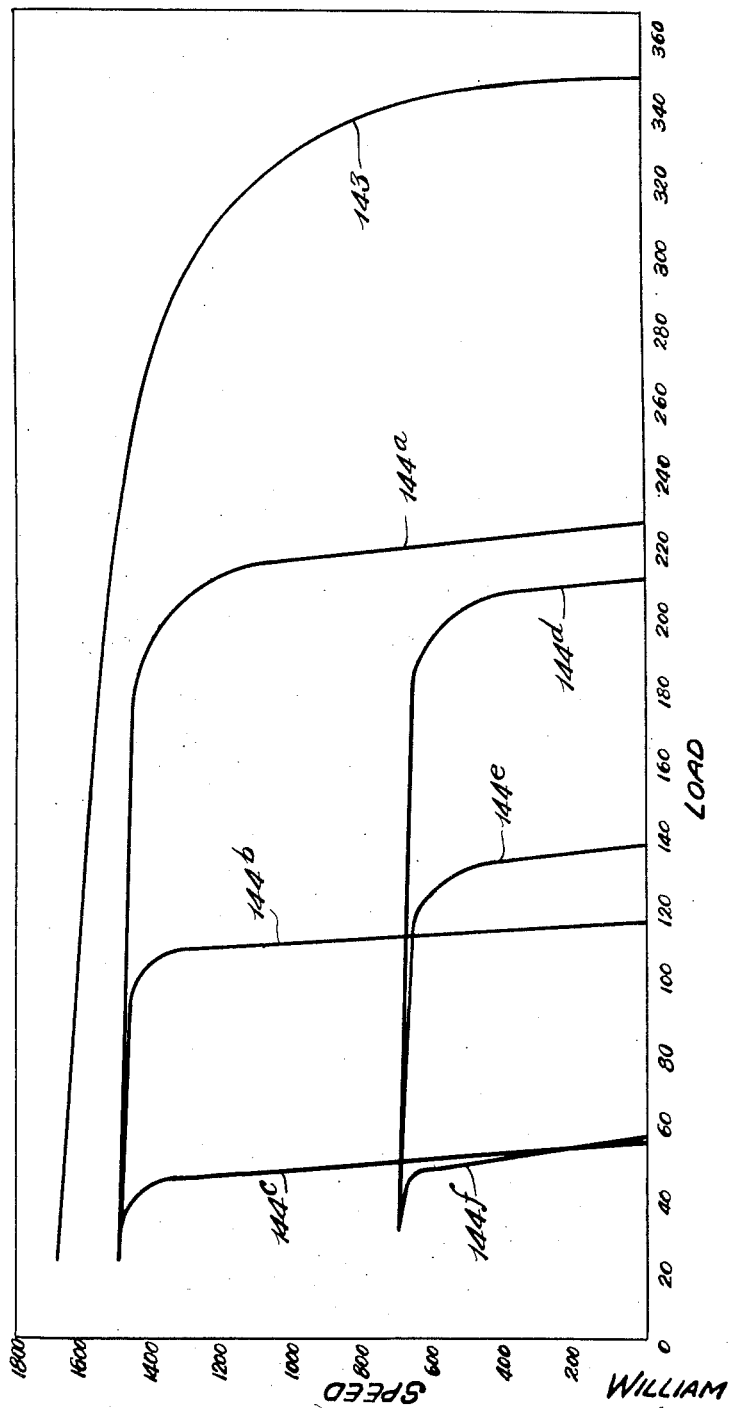
Fig. 2 is a diagrammatic view graphically illustrating the torque load characteristic of the control system.

Fig. 2 of the drawings illustrates graphically this torque limiting action of the resistance device 90. The curve 143 represents the maximum output of the clutch 15 with substantially full energization of the clutch winding 16. The curves 144ª, 144ᵇ and 144ᶜ represent the output of the clutch 15 for different horsepower loads on the driving motor 14 and for an output speed of the clutch of approximately 1500 R. P. M. The sharp downward turn of these curves illustrates the torque limiting effect of the resistance device 90 on the clutch output. The curves 144ᵈ, 144ᵉ and 144ᶠ are similar to the curves 144ª, 144ᵇ and 144ᶜ but show this torque limiting effect under the same load conditions and with the same driving motor but with a clutch output speed of approximately 700 R. P. M.

The overload control means of the system 10 is another important feature of the invention and includes the above-mentioned overload relay 23 which is effective on the driving motor 14 through the switch contacts 36 and 37 which are located in the energizing circuit of the magnet 22 of the magnetic switch 21. The overload control means also comprises a self-saturating reactor 145 by which the energization of the magnet 146 of the overload relay 23 is controlled in accordance with the load conditions under which the conveyor 11 is being operated. The reactor 145 comprises a suitable core having a main reactor winding 147 thereon and also having a bias winding 148 and a pair of control windings 149 and 150.

The power source for the reactor 145 is the constant voltage transformer 57 with which the input winding 151 of the transformer 142 is connected by the conductors 152 and 153. The output winding 154 of the transformer 142 is located in the energizing circuit of the magnet 146 of the overload relay 23 in series with the main reactor winding 147 of the reactor 145. This energizing circuit for the magnet 146 of the overload relay 23 extends from the output winding 154 through the conductor 155, through the reactor winding 147 and the conductor 156 to the relay magnet and then back through the conductors 157 and 158 to such output winding.

The energizing circuit for the magnet 146 also includes a rectifier 159 in the conductor 156 and a capacitor 160. The rectifier 159 enables the circuit, including reactor 145, to be used as a magnetic amplifier of the self-saturating type. The capacitor 160 being connected across the terminals of the magnet coil 146 of the overload relay 23 provides a hold-in current for energizing the magnet 146 during the one-half cycle when the rectifier 159 is not conducting.

The bias winding 148 of the reactor 145 magnetically opposes the main winding 147 and is energized from the output winding 154 of the transformer 142 through a bridge-type rectifier 162. The alternating current terminals of the rectifier are connected with the output winding 154 by the conductors 163 and 158. The bias winding 148 is connected with the direct current terminals of the rectifier 162 by the conductors 164 and 165.

This energizing circuit for the bias winding 148 also includes a resistor 166 and a regulating resistance 167 located in the conductor 165. The regulating resistance 167 varies the overload setting value at which the overload relay 23 will trip, that is, will open the switch contacts 36 and 37 for causing deenergization of the driving motor 14. The regulating resistance 167 is effective on the overload relay 23 through the bias winding 148 of the reactor 145.

The control winding 149 of the reactor 145 magnetically assists the main winding 147 and opposes the bias winding 148. The control winding 149 is responsive to the current in the output circuit 39 of the control system. The energizing circuit for the control winding 149 extends from the voltage divider 96 of the output circuit 39 through a conductor 168 to this control winding and then back to the conductor 40 of the output circuit through the conductor 169 and the conductor 134, the latter conductor being common to the energizing circuit of this control winding and the energizing circut of the negative feedback windings 76 of the reactors 63 and 64.

The energizing circuit for the control winding 149 includes a resistor 170, a choke coil 171 and a capacitor 172. The capacitor 172 is of a relatively large capacitance value and, in combination with the resistor 170, gives the energizing circuit for the control winding 149 the characteristic of a delay circuit to prevent operation of relay in the event of a momentary A. C. surge in the supply line. The choke coil 171 limits the value of the alternating current in the control winding 149 and is needed inasmuch as the alternating current impedance of the capacitor 172 is relatively low.

Since the control winding 149 magnetically assists the main winding 147, an increase in the energization of the output circuit 39 will be effective on the overload relay 23 through the reactor 145. The effect of the control winding 149 will, therefore, be to render the reactor 145 responsive to the magnitude of current in the output circuit 39, such that a predetermined increase in the energization of the output circuit will increase the extent of saturation of the core of reactor 145, and consequently increase the current flowing through the coil 23, to such a value to cause tripping of relay 23.

The control winding 150 of the reactor 145 can be referred to as a speed-compensating winding which magnetically opposes the main winding 147 and the control winding 149. This control winding 150 is a direct current winding which is connected to the reference voltage supply or rectifier 101 by the conductors 173 and 174. The conductor 173 is connected to terminal 104 of the rectifier 101 through the conductor 121, and the conductor 174 is connected to a terminal intermediate series-connected voltage dividing resistors 175 and 176 connected across the D. C. terminals 103, 104 of rectifier 101. The resistors 175 and 176 divide the output voltage of rectifier 101 and also provide a complete path for the direct current output of the tachometer generator which would otherwise be blocked by the rectifier 101.

The polarity of the control winding 150, in relation to the polarity of the self-saturating main winding 147, is such that it is in opposition to the latter winding, and when the reference voltage is increased to increase the speed at which the system is to operate, the energization of this control winding will also be increased to decrease the magnetization of reactor 145. The effect of the control winding 150 upon energization or increased energization is therefore by reason of its opposing relation to the main winding 147 such as to decrease the effectiveness of the windings 147 and 149 in tending to cause tripping of the overload relay 23.

The control system 10, as above described, serves the magnetic clutch 15, which may be only one of a group of such magnetic clutches to which power is being supplied.

The control system 10, as above described, may be only part of a larger control system in the event a plurality of magnetic clutches is being utilized to actuate the load. In this case, a control system similar to the control system 10 will be provided for each magnetic clutch but the A. C. voltage input into the reference voltage rectifier of each system will be supplied from a single powerstat 106 so that a single control may be used to vary the reference voltage output in each control system to select the speed of operation.

Figure 4:
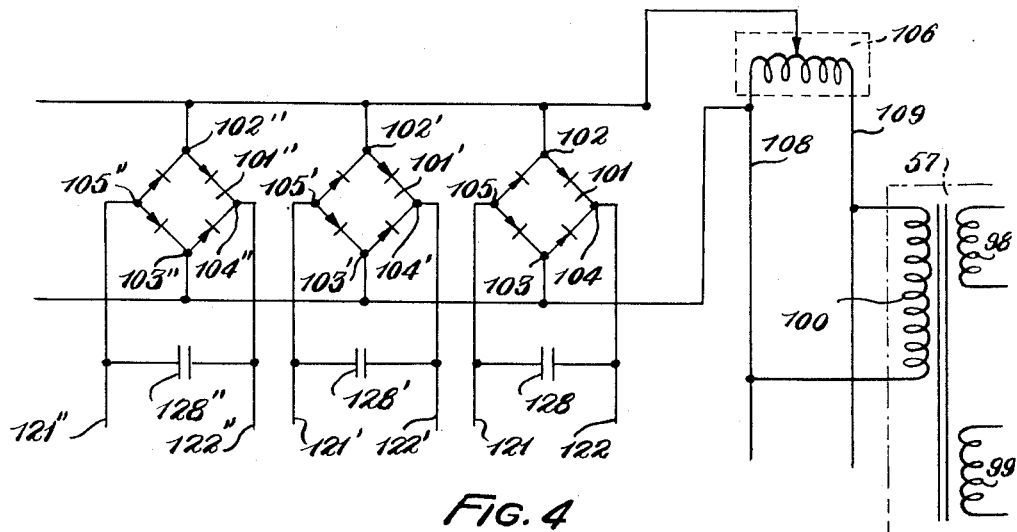
Fig. 4 is a fragmentary view of a wiring diagram showing the interconnection between duplicate portions of the control system.

Referring to Fig. 4, a plurality of rectifiers 101, 101', 101" for the control systems for three magnetic clutches are shown connected in parallel across the output of powerstat 106. The terminals of the rectifiers for each clutch have been given reference numerals corresponding to the terminals of the rectifier 101 with a prime or double prime affixed thereto, as the case may be. The same is true of the reference numerals for all other corresponding parts shown. It will be understood that the rectifiers shown in Fig. 4 are connected into the control systems for the individual clutches in the same manner as that illustrated in Fig. 1 for the rectifier 101.

From the accompanying drawings and the foregoing detailed description, it will now be seen that the present invention provides a control system which is stable and which may be used to maintain a substantially constant functional operation of a load, such as the speed of a device being driven through a magnetic clutch while the loading of the device is varied. A system embodying the present invention is capable of a wide range of speeds, while maintaining close regulation, and with undesirable hunting effects substantially eliminated. It will now also be seen that the system embodies torque limiting and overload control features by which the functioning of the system is effectively maintained within safe operating limits. Additionally it will be seen that the use of magnetic amplifiers in the system makes possible the achievement of these features and advantages in a simple and practical manner.

Although the novel control system has been illustrated and described herein to a detailed extent, it will be understood, of course, that the invention is not to be regarded as being limited correspondingly in scope, but includes all changes and modifications coming within the terms of the claims hereof.

Having thus described my invention, I claim:

1. In a control system for a clutch-driven apparatus, a magnetic clutch having a clutch coil, a power source, an output circuit including a torque limiting resistance, said clutch coil being connected with said resistance, a magnetic amplifier connecting said output circuit with said power source and comprising saturable reactor means having a control winding, circuit means connected with said control winding, and means responsive to change occurring in the speed of operation of said apparatus and effective through said circuit means for varying the energization of said control winding.

2. In a control system for a clutch-driven apparatus, a magnetic clutch having a clutch coil, a power source, an output circuit including a torque limiting impedance connected with said clutch coil, and a magnetic amplifier connecting said output circuit with said power source and comprising saturable reactor means having a negative feedback control winding energized from said output circuit.

3. In a control system for a clutch-driven apparatus, a magnetic clutch having a clutch coil, a power source, an output circuit having a torque limiting resistance connected with said clutch coil, a magnetic amplifier connecting said output circuit with said power source and comprising saturable reactor means having control windings comprising a first control winding and a negative feed-back winding, a first energizing circuit means connected with said first control winding, means responsive to change occurring in the speed of operation of said apparatus and effective through said first circuit means for varying the energization of said first control winding, and a second energizing circuit means connecting said negative feed-back winding with said output circuit for variably energizing the latter winding from said output circuit.

4. A control system as defined in claim 3 in which said clutch is an eddy-current clutch and said clutch coil is the field winding of the eddy-current clutch.

5. In an electric control system, a power source, an output circuit including an impedance device to be variably energized in accordance with a desired operational function of an apparatus to be controlled, a magnetic amplifier connecting said output circuit with said power source and comprising saturable reactor means having first and second control windings and negative feed-back windings, a first source of current of a substantially constant reference voltage value, a second source of current of a voltage value which is variable in response to variations occurring in the operational function of said apparatus, a first circuit means connecting said first control windings with the sources of said constant and variable voltage currents for energization in accordance with the resultant value of said voltages, a second circuit means connecting said negative feed-back windings with said output circuit to be variably energized therefrom, and a third circuit means connecting said second control windings with said second current source to be variably energized from the latter so as to oppose the action of the energization due to said first circuit means on changes in the operational function.

6. In a control system for a clutch-driven apparatus, a magnetic clutch having a clutch coil, a power source, an output circuit including a torque limiting resistance connected with said clutch coil, a magnetic amplifier connecting said output circuit with said power source and comprising saturable reactor means having control windings and feed-back windings, a first source of current of a substantially constant reference voltage value, a second source of current of a voltage value which is variable in response to variations occurring in the speed at which said apparatus is driven, a first circuit means connecting said control windings with the sources of said constant and variable voltage currents for energization in accordance with the resultant value of said voltages, a second circuit means connecting said negative feed-back windings with said output circuit to be variably energized therefrom, and a third circuit means connecting said control windings with said second current source to be variably energized from the latter in opposition to the energization of said first circuit means upon speed changes.

7. A control system as defined in claim 6 in which said second current source is a direct current tachometer generator driven at a speed which is substantially proportional to the speed of said apparatus and said first circuit means is a direct current circuit and said third circuit means is an alternating current circuit responsive to voltage variations in the output of said tachometer generator.

8. In a control for a clutch-driven apparatus; a plurality of magnetic clutches having clutch coils; control units for the respective clutches and each comprising a power source, an output circuit having a torque limiting resistance connected with each one of said clutch coils, a magnetic amplifier connecting said output circuit with said power source and comprising saturable reactor means having control windings, negative feed-back windings, a source of current of a voltage value which is variable in response to variations occurring in the speed at which said apparatus is driven by said clutches, a first circuit means connecting said control windings with said source of variable voltage and a second circuit means connecting said negative feed-back windings with said output circuit for energization from the latter; a common source of current of a substantially constant reference voltage value for all of said control units and connected with the first circuit means of said units such that the control windings of all of said units are energized in accordance with the resultant value of said variable and constant voltages; and a single adjustable control means controlling the current supplied to all of said systems from said common source of constant voltage current.

9. In a substantially constant speed electric drive system, a power source, a load actuating means including an impedance means; to be variably energized in accordance with the requirements of the load to be driven, an impedance energizing circuit for said impedance, self-saturating reactor means connecting the impedance energizing circuit with said power source and having windings comprising energizing windings connected with said power source and a pair of control windings one of which is connected with said impedance circuit to be variably energized therefrom, circuit means for the other of said control windings, and means effective through the last-mentioned circuit means for variably energizing said other control winding with a current dependent upon the speed of actuation of said load.

10. In a substantially constant speed electric drive system, a power source, a load actuating means including a coil and an impedance device to be variably energized in accordance with the requirements of the load to be driven, a coil energizing circuit for said coil, self-saturating reactor means connecting the coil circuit and said power source and having windings comprising energizing windings connected with said power source and a pair of control windings one of which is connected with said coil circuit to be variably energized therefrom, a first current source for current of a substantially constant reference voltage value, a second current source for current of a voltage value dependent upon the speed of actuation of said load, and circuit means connecting said other control winding with the sources of said constant and variable voltage currents for energization of said other control winding in accordance with the resultant value of said voltages.

11. An electric system as defined in claim 10 in which said second current source is a tachometer generator driven at a speed substantially proportional to the speed of said load.

12. An electric system as defined in claim 10 in which said second current source is a direct current tachometer generator driven at a speed substantially proportional to the speed of said load and in which the control windings of said reactor means also include an alternating current control winding connected with said tachometer generator to be variably energized therefrom upon changes in the output voltage of said generator.

13. In an electrical system, a power source, a load circuit connected with said power source and including a load actuating means, overload relay switch means including a coil and contact means responsive to said coil and controlling said load circuit, an energizing circuit for said coil, a current source for current of a voltage value which is variable in response to variations occurring in the speed of actuation of the load, and saturable reactor means effective between said power source and the coil circuit for energizing the latter and including a control winding connected with said current source and variably energized from the latter for rendering the operation of said switch means responsive to said load.

14. In an electrical system, a power source, a load circuit connected with said power source and including a load actuating means, overload relay switch means having a coil and contact means responsive to said coil and controlling said load circuit, an energizing circuit for said coil, a current source for current of a voltage value which is variable according to the selected speed of actuation of the load, and a self-saturating reactor effective between said power source and the coil circuit for energizing the latter, said reactor having an energizing winding in said coil circuit and a control winding connected with said current source and energized from the latter.

15. In an electrical system, a power source, a load circuit including a load actuating means, a speed control system connecting said load circuit with said power source and including speed selecting means having a variable output voltage the magnitude of which determines the speed of actuation of the load, overload relay switch means having a coil and contact means responsive to said coil and controlling said load circuit, an energizing circuit for said coil, and saturable reactor means effective between said power source and the coil circuit for energizing the latter, said reactor means having control windings including a winding connected with said speed selecting means to be energized therefrom.

16. In an electrical system, a power source, a load circuit connected with said power source and including a load actuating means, overload relay switch means having a coil and contact means responsive to said coil and controlling said load circuit, an energizing circuit for said coil, a current source for current of a voltage value which is variable in accordance with the selected speed of actuation of the load, saturable reactor means effective between said power source and the coil circuit for energizing the latter, said reactor means having control windings including a load speed selector winding connected with said current source to be energized therefrom and a bias winding, an energizing circuit for said bias winding, and adjustable control means in the latter circuit and effective through said reactor means for varying the operation of said relay switch means.

17. In an electrical system, a power source, a load circuit connected with said power source and including an electric driving motor, a magnetic clutch connecting said motor with a load to be driven and having a clutch coil, a clutch circuit including said clutch coil, means for variably energizing said clutch circuit in accordance with a function of said load, overload relay switch means having a relay coil and contact means responsive to the relay coil and controlling said load circuit, a relay circuit for energizing said relay coil, and saturable reactor means effective between said power source and said relay circuit for energizing the latter and including a control winding connected with said clutch circuit and variably energized from the latter for rendering the operation of said switch means responsive to said load.

18. In an electrical system, a power source, a load circuit connected with said power source and including an electric driving motor, a magnetic clutch connecting said motor with a load to be driven and having a clutch coil, a clutch circuit including said clutch coil, means for variably energizing said clutch circuit in accordance with a function of said load, overload relay switch means having a relay coil and contact means responsive to the relay coil and controlling said load circuit, a relay circuit for energizing said relay coil, a current source for current of a voltage value which is variable in accordance with the selected speed of actuation of said load, and saturable reactor means effective between said power source and said relay circuit for energizing the latter and including a first control winding connected with said clutch circuit and variably energized therefrom and a second control winding connected with said current source and energized from the latter.

19. In an electrical system, a power source, a load circuit connected with said power source and including an electric driving motor, a magnetic clutch connecting said motor with a load to be driven and having a clutch coil, a clutch circuit including said clutch coil, means for variably energizing said clutch circuit in accordance with a function of said load, relay switch means having a relay coil and contact means responsive to the relay coil and controlling said load circuit, a relay circuit for energizing said relay coil, a current source for current of a voltage value which is variable in accordance with the selected speed of actuation of said load, saturable reactor means effective between said power source and said relay circuit for energizing the latter, said reactor having control windings comprising a bias winding and first and second control windings of which said first and second control windings are energized respectively from said clutch circuit and said current source, an energizing circuit for said bias winding, and adjustable control means in the latter circuit and effective through said reactor means for varying the operation of said relay switch means.

20. In an electrical system, a power source, a load circuit connected with said power source and including an electric driving motor, a magnetic clutch connecting said motor with a load to be driven and having a clutch coil, a clutch circuit including said clutch coil, means for variably energizing said clutch circuit in accordance with a function of said load, overload relay switch means having a relay coil and contact means responsive to the relay coil and controlling said load circuit, a relay circuit for energizing said relay coil, a current source for current of a voltage value which is variable in accordance with the selected speed of actuation of said load, a self-saturating reactor effective between said power source and said relay circuit for energizing the latter, said reactor having an energizing winding in said relay circuit and also having control windings comprising a bias winding and a pair of windings energized respectively from said clutch circuit and said current source, an energizing circuit for said bias winding, and adjustable control means in the latter circuit and effective through said reactor for varying the operation of said relay switch means.

21. In a substantially constant speed electric drive system, a power source, a load circuit connected with said power source and including an electric driving motor, a magnetic clutch connecting said motor with a load to be driven and having a clutch coil, overload relay switch means having a relay coil and contact means responsive to the relay coil means and controlling said load circuit, a clutch circuit including said clutch coil and torque limiting resistance, self-saturating reactor means connecting said clutch circuit with said power source and having windings comprising main windings connected with said power source and said clutch coil and a pair of control windings one of which is connected with said clutch circuit to be variably energized therefrom, a first current source for current of a substantially constant reference voltage value, a second current source for current of a voltage value which is variable in response to variation in the speed of actuation of said load, circuit means connecting the other control winding with the sources of said constant and variable voltage currents for energization of said other control winding in accordance with the resultant value of said voltages, a relay circuit having said relay coil therein, and a second self-saturating reactor means effective between said power source and said relay circuit for energizing the latter, said second reactor means having a main winding in said relay circuit and a pair of control windings energized respectively from said clutch circuit and said second current source.

22. The electric drive system as defined in claim 21 wherein the first named self-saturating reactor includes an additional control winding adapted to be selectively energized in response to predetermined variations of speed of said load.

23. The electric drive system as defined in claim 22 wherein said additional control winding is connected with a capacitor as a tuned circuit.

24. In an electric control system, a power source, an output circuit including an impedance device to be variably energized in accordance with a desired operational function of an apparatus to be controlled, a magnetic amplifier connecting said output circuit with said power source and comprising saturable reactor means having first and second control windings, a first source of current of substantially constant reference voltage value, a second source of current of a voltage value which is variable in response to variations occurring in the operational function of said apparatus, first circuit means connecting said first control winding with the source of said constant and variable voltage currents for energization in accordance with the resultant value of said voltages, and a tuned circuit including said second control winding connected to said second current source to be selectively energized therefrom.

25. The electric control system as defined in claim 24 wherein the tuned circuit is characterized as a series resonant circuit.

26. In an electric control system, a power source, an output circuit to be variably energized in accordance with a desired operational function of apparatus to be controlled, a magnetic amplifier connecting said output circuit with said power source and comprising saturable reactor means having first and second control windings, means responsive to change occurring in said operational function, a first energizing circuit means connected between said first control windings and said responsive means for varying the energization of said first control winding, a capacitor connected with said control winding and proportioned to act as a tuned circuit therewith to predetermined changes in operational function, and a second energizing circuit means connecting said tuned circuit with said responsive means.

27. The electric control system as defined in claim 26 wherein the capacitor and said second control winding are characterized as a series resonant circuit wherein said second control winding is effective to oppose the excitation provided by the first control winding for said reactor.

28. In an electric control system, a power source, an output circuit including an impedance device to be variably energized in accordance with a desired operational function of the apparatus to be controlled, a magnetic amplifier connecting said output circuit with said power source and comprising saturable reactor means having a first and second control windings, means responsive to change occurring in said operational function, a first energizing circuit means connected between said first control windings and said responsive means for varying the energization of said first control winding, a capacitor connected with said second control winding to provide a tuned circuit therewith to predetermined changes in operational function, and a second energizing circuit means connecting said second control winding and said capacitor with said responsive means.

29. In a substantially constant speed electric drive system, a power source, a load circuit connected with said power source and including an electric driving motor, a magnetic clutch connecting said motor with a load to be driven and having a clutch coil, overload relay switch means having a relay coil and contact means responsive to the relay coil means and controlling said load circuit, a clutch circuit including said clutch coil and a torque limiting resistance, saturable reactor means connecting said clutch circuit with said power source and having windings comprising main windings connected with said power source and said clutch coil and a plurality of control windings one of which is connected with said clutch circuit to be variably energized therefrom, a first current source for current of substantially constant reference voltage value, a second current source for current of a voltage value which is variable in response to variation in the speed of actuation of said load, circuit means connecting a second control winding with the source of said constant and variable voltage currents for energization of said second control winding in accordance with the resultant value of said voltages, a capacitor connected in a series tuned circuit relationship with a third control winding, circuit means connecting said capacitor and said third control winding with said second current source, a relay circuit having said relay coil therein, and a second saturable reactor means effective between said power source and said relay circuit for energizing the latter, said second reactor means having a main winding in said relay circuit and a pair of control windings energized respectively from said clutch circuit and said second current source.

References Cited in the file of this patent

UNITED STATES PATENTS

| | | |
|---|---|---|
| 2,504,105 | Bendz | Apr. 18, 1950 |
| 2,512,317 | Edwards | June 20, 1950 |
| 2,551,839 | Jaeschke | May 8, 1951 |
| 2,594,372 | Wattenberger | Apr. 29, 1952 |
| 2,639,395 | Jaeschke | May 19, 1953 |
| 2,682,618 | Jaeschke | June 29, 1954 |
| 2,697,794 | Jaeschke | Dec. 21, 1954 |